(12) United States Patent
McMillion

(10) Patent No.: US 9,732,733 B2
(45) Date of Patent: Aug. 15, 2017

(54) TWO PHASE WIND POWER GENERATOR SYSTEM

(71) Applicant: Jimmy McMillion, Howe, TX (US)

(72) Inventor: Jimmy McMillion, Howe, TX (US)

(*) Notice: Subject to any disclaimer, the term of this patent is extended or adjusted under 35 U.S.C. 154(b) by 0 days.

(21) Appl. No.: 14/940,017

(22) Filed: Nov. 12, 2015

(65) Prior Publication Data

US 2017/0138349 A1 May 18, 2017

(51) Int. Cl.
| | |
|---|---|
| *F03D 9/00* | (2016.01) |
| *H02P 9/04* | (2006.01) |
| *H02K 7/00* | (2006.01) |
| *H02K 11/04* | (2016.01) |
| *F03D 7/04* | (2006.01) |

(52) U.S. Cl.
CPC ............ *F03D 9/002* (2013.01); *F03D 7/042* (2013.01); *H02K 7/003* (2013.01); *H02K 11/04* (2013.01)

(58) Field of Classification Search
USPC ........... 290/44, 55; 310/110–119; 322/50–59
See application file for complete search history.

(56) References Cited

U.S. PATENT DOCUMENTS

| | | | |
|---|---|---|---|
| 3,649,903 A | 3/1972 | Fiedler | |
| 4,663,581 A * | 5/1987 | Glennon | H02K 16/00 310/114 |
| 4,780,659 A | 10/1988 | Bansal et al. | |
| 4,786,852 A | 11/1988 | Cook | |
| 5,177,388 A * | 1/1993 | Hotta | H02K 9/06 310/114 |
| 6,504,260 B1 | 1/2003 | Debleser | |
| 7,309,938 B1 * | 12/2007 | Smith | H02K 7/1807 310/112 |
| 8,198,743 B2 * | 6/2012 | Anghel | F03D 9/002 290/44 |
| 8,279,648 B2 * | 10/2012 | Dooley | H02M 7/4807 363/131 |
| 9,054,554 B2 * | 6/2015 | Uemura | H02J 1/102 |
| 9,490,687 B2 * | 11/2016 | Watanabe | B60K 6/26 |
| 9,574,643 B2 * | 2/2017 | Pohl | F16H 15/52 |
| 9,590,545 B2 * | 3/2017 | Frampton | H02P 9/00 |
| 2003/0057708 A1 | 3/2003 | Wu | |
| 2004/0222642 A1 | 11/2004 | Siebenthaler et al. | |
| 2008/0137383 A1 | 6/2008 | Chang et al. | |

(Continued)

*Primary Examiner* — Pedro J Cuevas
(74) *Attorney, Agent, or Firm* — The Law Office of Jerry D. Haynes

(57) ABSTRACT

A two phase wind power generator system for producing an electrical output having twice the voltage relative to single phase systems includes a shaft connected to an external shaft rotator, a generator aspect integral with the shaft and an output aspect connected to the generator aspect. The generator aspect includes a power source, switching commutator with integrated brushes, first rotor assembly, first stator assembly, second rotor assembly, and a second stator assembly, with the switching commutator, the first rotor assembly and second rotor assembly discretely mounted to shaft, with the rotor assemblies oriented 180 degrees out of phase. The power source energizes the rotor assemblies, and when the shaft is rotated by an external force, electricity is induced in the stator assemblies. The output aspect is operative to receive electricity induced thereby and convert it to a desired form of electrical current as well as combine it for output.

7 Claims, 2 Drawing Sheets

(56) References Cited

U.S. PATENT DOCUMENTS

| | | | |
|---|---|---|---|
| 2009/0237968 A1* | 9/2009 | Dooley | H02M 7/4807 363/97 |
| 2009/0304368 A1* | 12/2009 | Boissonnade | H02K 11/21 388/800 |
| 2011/0169267 A1 | 7/2011 | Chen | |
| 2013/0057057 A1* | 3/2013 | Uemura | H02J 1/102 307/9.1 |

* cited by examiner

TWO PHASE WIND POWER GENERATOR SYSTEM

BACKGROUND OF THE INVENTION

Field of the Invention

This invention relates generally to electrical generators and, more particularly, to a two phase wind power generator system for producing rectified direct current electricity.

Description of the Prior Art

The use of conventional direct current ("DC") motors to induce electricity is well established. Indeed, simply turning the shaft of a DC motor causes it to act like a generator. As a result, in circumstances where it is desired to generate electricity, it is common for the shaft of a DC motor to be connected to an external rotating force, such as a wind turbine.

A problem which still exists, however, is that with many typical wind turbine/DC motor generator configuration which utilize single phase operation, a desirable amount of electrical power is simply not able to be generated. Thus, there remains a need for a two phase wind power generator system which would double the voltage produced from an equivalent amount of shaft rotation. It would be helpful if such a two phase wind power generator system included two discrete rotor and stator assemblies mounted to a single shaft. It would be additionally desirable for such a two phase wind power generator system to produce two alternating current ("AC") outputs which were 180 degrees out of phase, which could then be rectified and combined to double the voltage of the output.

The Applicant's invention described herein provides for a two phase wind power generator system adapted to produce two discrete electrical currents from the rotation of a single shaft. The primary components in Applicant's two phase wind power generator system are a shaft, a switching commutator, two rotor assemblies with corresponding stator assemblies, and a rectifier. When in operation, the two phase wind power generator system enables the production of an electrical output having twice the voltage from the rotation of a single shaft. As a result, many of the limitations imposed by prior art structures are removed.

SUMMARY OF THE INVENTION

A two phase wind power generator system for producing an electrical output having twice the voltage relative to single phase systems. The two phase wind power generator system comprises a shaft operative to connect to an external shaft rotator, a generator aspect and an output aspect. The generator aspect includes a power source, switching commutator with integrated brushes, first rotor assembly, first stator assembly, second rotor assembly, and a second stator assembly, with the switching commutator, the first rotor assembly and second rotor assembly each mounted at various points along the shaft, with the rotor assemblies oriented 180 degrees out of phase. The power source energizes the rotor assemblies, and when the shaft is rotated by an external force, electricity is induced in the stator assemblies. The output aspect is electrically connected to the stator assemblies and operative to receive electricity induced thereby and convert it to a desired form of electrical current as well as combine it for output.

It is an object of this invention to provide a two phase wind power generator system which would double the voltage produced from an equivalent amount of shaft rotation.

It is another object of this invention to provide a two phase wind power generator system which includes two discrete rotor and stator assemblies mounted to a single shaft.

It is yet another object of this invention to provide a two phase wind power generator system which produces two AC outputs which were 180 degrees out of phase and rectifies and combines them to double the voltage of the electrical output.

These and other objects will be apparent to one of skill in the art.

DETAILED DESCRIPTION OF THE INVENTION

Figure 1:
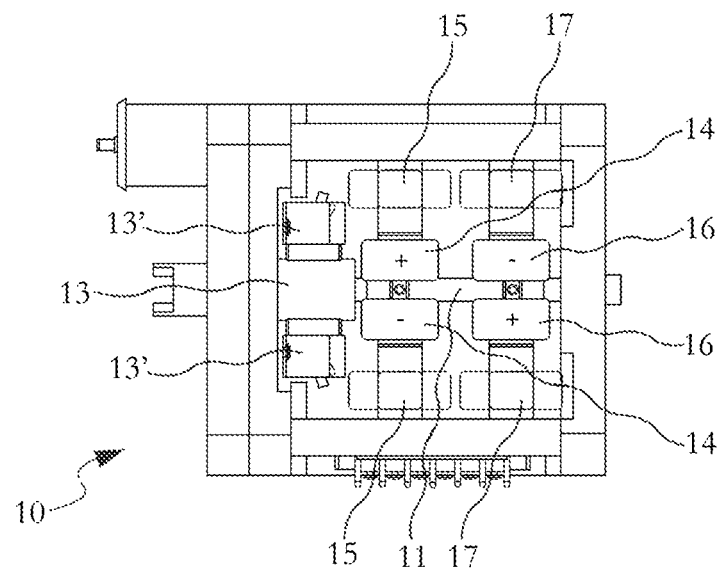
FIG. 1 is a block diagram of the generator aspect a two phase wind power generator system built in accordance with the present invention.
Figure 2:
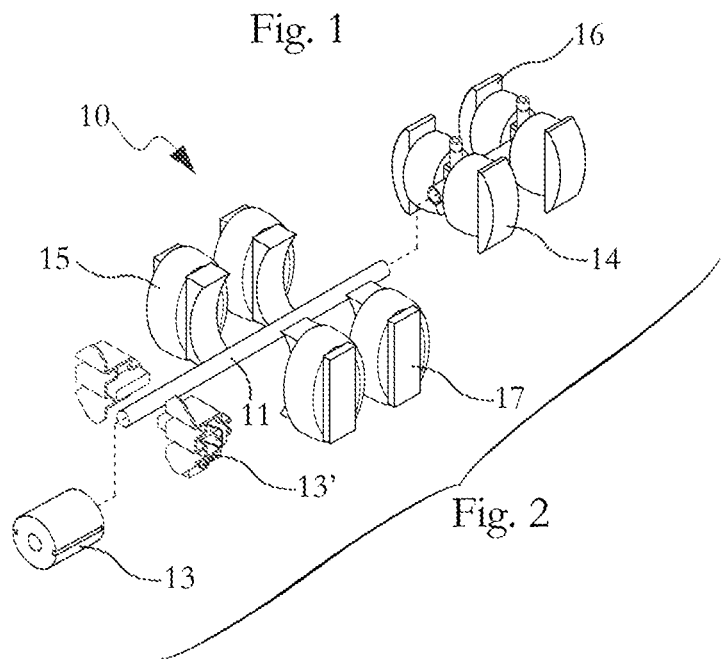
FIG. 2 is an exploded perspective view of the shaft and generator aspect of a two phase wind power generator system built in accordance with the present invention.
Figure 3:
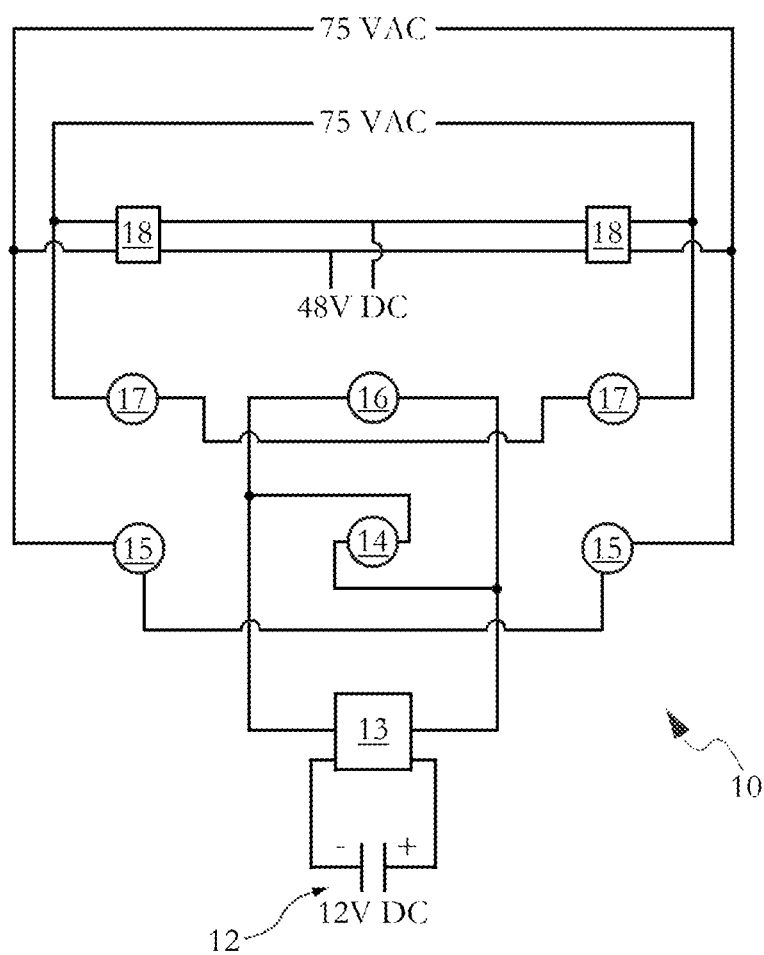
FIG. 3 is an electrical diagram of the generator aspect and output aspect of a two phase wind power generator system built in accordance with the present invention.

Referring now to the drawings and in particular FIGS. 1 through 3, a two phase wind power generator system 10 is shown having a shaft 11 operative to connect to an external shaft rotator (not shown), a generator aspect and an output aspect. While it is contemplated that the external shaft rotator would typically define a conventional wind turbine to supply the requisite external rotational force, it is understood that any external rotating device may be employed with the instant invention.

The generator aspect is integrated with the shaft so as to induce electricity from the rotation of the staff. In one embodiment, the generator aspect defines a power source 12, a switching commutator 13, first rotor assembly 14, a first stator assembly 15, a second rotor assembly 16 and a second stator assembly 17, with the switching commutator 13, the first rotor assembly 14 and second rotor assembly 16 each mounted to the shaft 11. In the preferred embodiment, a 12 V battery defines the power source, the first rotor assembly 14 and second rotor assembly 16 each define a pair of wound, electromagnetic rotors and the first stator assembly 15 and second stator assembly 17 define identical conventional windings with an iron core.

The output aspect is integrated with the generator aspect so as to convert electricity induced thereby to a desired form of electrical current and combine it for output by the two phase wind power generator system 10. In one embodiment, the output aspect defines a pair of rectifiers 18.

In accordance with the preferred embodiment, electricity from the power source 12 is supplied to the first rotor assembly 14 and second rotor assembly 16 by way of the commutator 13, with the first rotor assembly 14 and second rotor assembly 16 wired such that electrical charge directed to the first rotor assembly 14 at any given time is always the opposite as the electrical charge directed to the second rotor assembly 16. Accordingly, even as the commutator 13 reverses polarity of the rotor assemblies 14, 16, the first rotor assembly 14 and second rotor assembly 16 remain at a 180 degree phase difference.

It is contemplated that the commutator 13 operates with conventional brushes 13' in its operation to reverse polarity as the shaft 11 rotates.

When the rotor assemblies 14, 16 are energized by the power source 12 and being rotated by the shaft 11, the first stator assembly 15 and second stator assembly 17 are operative to interact with the electromagnetic field created by the first rotor assembly 14 and second rotor assembly 16, respectively, to induce an electrical current. Because of the wiring of the rotor assemblies 14, 16, however, the electrical current induced is 180 degrees out of phase. This electrical current is then directed to the respective rectifiers 18 for conversion to DC. Prior to being output by the two phase wind power generator system 10, the two DC outputs from the rectifiers 18 are combined to form an irregular, but constant, electrical output, creating a total system output having double the voltage.

As stated above, it is contemplated that in typical embodiments, the shaft 11 will be rotated by a wind turbine. Thus, it is understood that the electrical output of the two phase wind power generator system 10 will always depend on the speed at which the wind turbine (or other external device) rotates the shaft 11.

In one embodiment, with the shaft at 1500 RPM, an isolated 75 V AC is produced by each stator assembly 15, 17, with approximately 28 cycles per second. Each 75 V AC is rectified to 24 V DC and then combined to form a single 48 V DC output.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A two phase wind power generator system for producing electricity from rotation force, comprising:
   a shaft mechanically connected to an external shaft rotator, where the external shaft rotator is a wind turbine, so as to allow the shaft to be rotated;
   a generator aspect having a power source, wherein said power source is a 12V battery, a switching commutator integrated with a pair of brushes, a first rotor assembly, a first stator assembly, a second rotor assembly, second stator assembly, wherein said switching commutator, the first rotor assembly and second rotor assembly are each mounted to the shaft at discrete locations, and said first rotor assembly and second rotor assembly define a pair of wound electromagnetic rotors, and the first stator assembly and second stator assembly define identical windings with an iron core;
   said generator aspect configured to generate an isolated first electrical current and an isolated second electrical current from the rotation of the shaft by the external shaft rotator, wherein the first electrical current and second electrical current are 180 degrees out of phase, wherein said commutator reverses polarity of the first rotor assembly and second rotor assembly so that the first rotor assembly and second rotor assembly remain at a 180 degree difference; and
   an output aspect electrically connected to said generator aspect, wherein said output aspect is configured such that when the first electrical current and second electrical current are generated by the generator aspect, the output aspect rectifies said first electrical current and second electrical current and combines said first electrical current and second electrical current to form a constant electrical output creating double the voltage of either the first electrical current or the second electrical current.

2. The two phase wind power generator system of claim 1, wherein the first rotor assembly is operatively aligned with the first stator assembly and the second rotor assembly is operatively aligned with the second stator assembly.

3. The two phase wind power generator system of claim 2, wherein said generator aspect is configured to generate the isolated first electrical current and the isolated second electrical current through the supply of electrical power from the power source to the first rotor assembly in a first direction and to the second rotor assembly in a second direction such that the rotation of the shaft causes the first rotor assembly to induce the first electrical current in the first stator assembly and the second rotor assembly to induce the second electrical current in the second stator assembly.

4. The two phase wind power generator system of claim 1, wherein said output aspect includes a plurality of rectifiers.

5. The two phase wind power generator system of claim 1, wherein said output aspect is configured such that when the first electrical current and second electrical current are generated by the generator aspect, the output aspect rectifies said first electrical current and second electrical current and combines said first electrical current and second electrical current.

6. A method of two phase electrical power generating, comprising the steps of:
   mechanically connecting a shaft to an external shaft rotator, where the external shaft rotator is a wind turbine, so as to allow the shaft to be rotated;
   providing a generator aspect having a power source, a switching commutator integrated with a pair of brushes, a first rotor assembly, a first stator assembly, a second rotor assembly, second stator assembly,
   mounting said switching commutator, the first rotor assembly and second rotor assembly to the shaft at discrete locations such that the first rotor assembly is operatively aligned with the first stator assembly and the second rotor assembly is operatively aligned with the second stator assembly;
   supplying by said power source electrical power to the first rotor assembly in a first direction and to the second rotor assembly in a second direction such that the rotation of the shaft causes the first rotor assembly to induce a first electrical current in the first stator assembly and the second rotor assembly to induce a second electrical current in the second stator assembly, wherein the first electrical current and second electrical current are 180 degrees out of phase, wherein said commutator reverses polarity of the first rotor assembly and second rotor assembly so that the first rotor assembly and second rotor assembly remain at a 180 degree difference; and
   when the first electrical current and second electrical current are generated by the generator aspect, rectifying by an output aspect electrically connected to said generator aspect said first electrical current and second electrical current, to form a constant electrical output creating double the voltage of either the first electrical current or the second electrical current.

7. The method of claim 6, additionally comprising the step of combining said first electrical current and second electrical current once each has been rectified.

* * * * *